United States Patent [19]
Finley

[11] Patent Number: 5,102,180
[45] Date of Patent: Apr. 7, 1992

[54] VEHICLE COVER WITH SIDEWAYS ACCESSIBLE STORAGE CONTAINER

[76] Inventor: Jerry D. Finley, 234 Grey Pl., Belen, N. Mex. 87002

[21] Appl. No.: 552,077

[22] Filed: Jul. 13, 1990

[51] Int. Cl.⁵ .............................................. B60R 11/06
[52] U.S. Cl. .................................. 296/37.6; 296/100; 296/37.1; 224/42.42
[58] Field of Search ............... 296/24.1, 37.1, 37.6, 296/100; 224/42.42, 281

[56] References Cited

U.S. PATENT DOCUMENTS

| | | | |
|---|---|---|---|
| 3,640,423 | 2/1972 | Parker | 220/324 |
| 4,288,011 | 9/1981 | Grossman | 224/42.42 |
| 4,674,665 | 6/1987 | Vankirk | 224/273 |
| 4,728,017 | 3/1988 | Mulligan | 224/42.42 |
| 4,770,330 | 9/1988 | Bonstead et al. | 296/37.6 X |
| 4,807,921 | 2/1989 | Champie | 296/88 |
| 4,844,305 | 2/1989 | McKneely | 224/42.42 |
| 4,854,631 | 8/1989 | Laursen | 296/24.1 X |
| 4,917,430 | 4/1990 | Lawrence | 296/37.6 |
| 4,936,624 | 6/1990 | West | 296/37.6 |
| 5,016,935 | 5/1991 | Semple | 296/100 X |

*Primary Examiner*—Margaret A. Focarino
*Assistant Examiner*—Joseph D. Pape

[57] ABSTRACT

Improved cover for an open topped vehicle with an across-the-bed storage container such as a tool box and having accessibility to the storage container from the exterior of the vehicle. Access from outside the vehicle cover is made by way of an access opening. The storage container is quickly attachable and detachable thus allowing the vehicle to serve purpose in the construction professions, recreation and other uses. The container is portable thus allowing it to serve as a tool organizer and a portable work table at job sites.

4 Claims, 4 Drawing Sheets

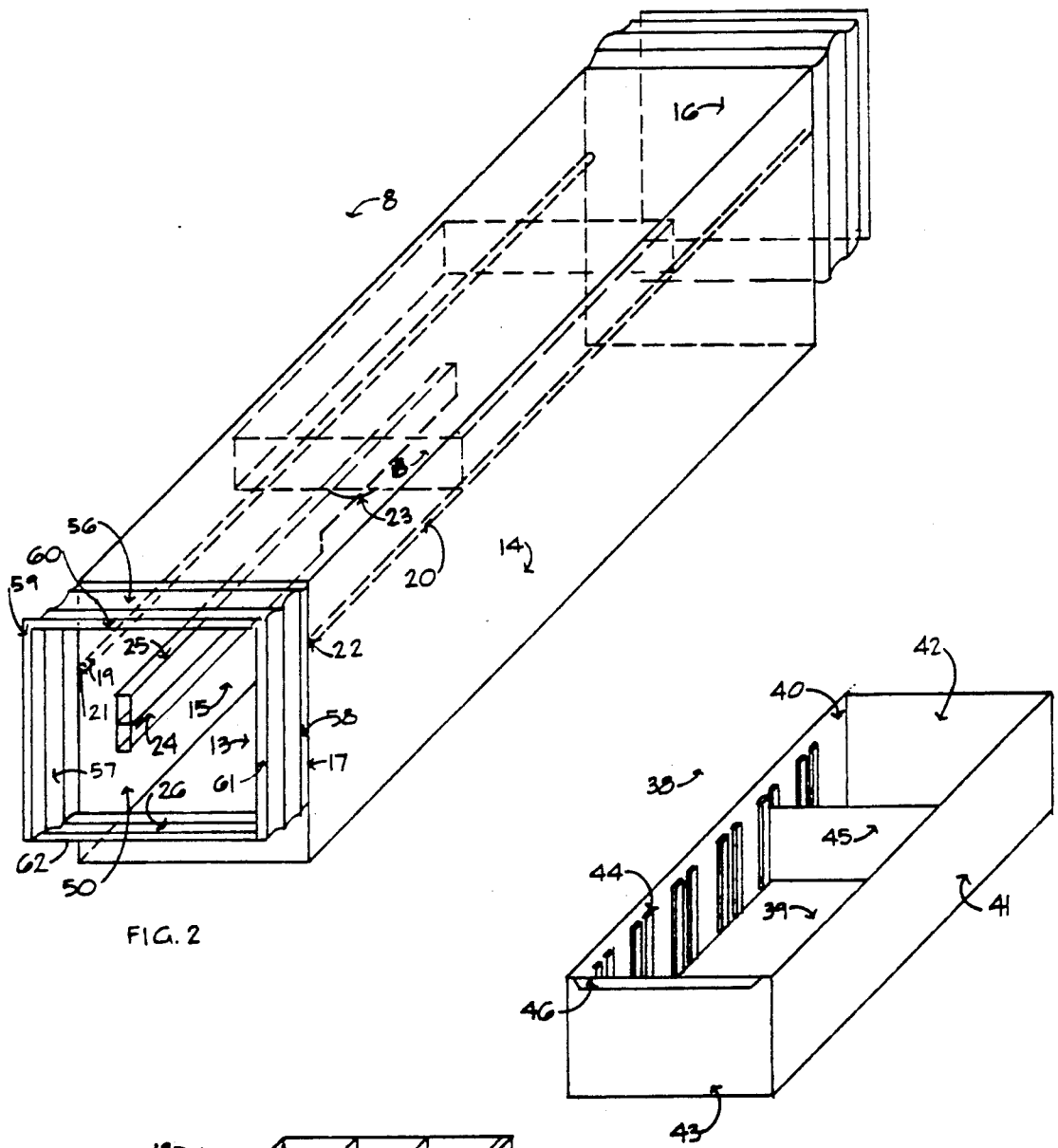
FIG. 2
FIG. 4
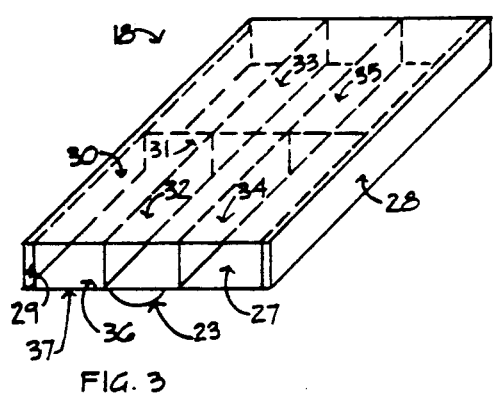
FIG. 3

VEHICLE COVER WITH SIDEWAYS ACCESSIBLE STORAGE CONTAINER

BACKGROUND OF THE INVENTION

FIELD OF INVENTION

This invention relates to the covering of the cargo area of an open topped vehicle bed and specifically to having an organized and easily accessible tool and/or storage container, a means of securing both, and means for quickly attaching and detaching said storage container, thus allowing complete cargo area to be available for recreational use.

Pick up covers, also called toppers and campers in the industry, but consistently referred to as covers in this application, have been used for camping and by contractors in the construction profession for some time. Said covers in conjunction with open topped vehicles form a cargo area that can carry cargo that is protected from the weather elements and said cargo is secured by means of latches.

Across-the-bed tool and/or storage containers for pick up trucks have also been in use for some time. The terminology across-the-bed tool and/or storage container refers to a tool and/or storage container that is mounted transverse the longitudinal axis of an open topped vehicle and is supported by both of said vehicle's sidewalls thus leaving the tool and/or storage container accessible from either side of said vehicle's exterior. These said tool and/or storage containers mount with the bottom being in a position several inches below the pick up bed sidewalls, access from the top, and rest on the sidewalls of said vehicle, leaving it impractical to try to use said tool and/or storage containers with covers as this would prevent the doors from opening enough to put in or remove objects and would require crawling into the cover. Since these said tool and/or storage containers need to be used without a cover it leaves cargo in the vehicle exposed to the weather elements and unsecured. There are some heavy duty truck beds with side mounted tool boxes available at this time. Some of these also have a means of covering the remaining cargo area. These are quite expensive and do not give a pick up the design appearance that a cover does, thus explaining why these and other side mount type storage boxes with a means of covering the cargo area have not met with widespread commercial acceptance. Instead, across the country contractors continue to use either a pick up cover or an across-the-bed tool and/or storage container.

U.S. Pat. No. 4,844,305 to McNeely discloses a cargo compartment organizer which covers the cargo area of a pick up bed. This type of cargo area cover leaves only about one half of the usable, protected cargo area of a standard cover. McNeely's cover also leaves it very difficult to enter the cargo area to retrieve smaller materials that may be near the cab of the pick up.

U.S. Pat. No. 4,889,381 to Tamblyn and Forde is one of several retractable pick up bed covers that are patented at this time. These said retractable covers, cover only about one half of the cargo space of standard covers. There is an across-the-bed storage container on the market designed for use with these said retractable bed covers. The design of the said retractable bed covers demand that such tool and/or storage containers mount above said retractable bed covers thus leaving a very small tool area.

SUMMARY OF THE INVENTION

It is the intent of this invention to provide an across-the-bed tool and/or storage container for use with an open topped vehicle, such as a pick up truck, said container having access through the ends of said container of a size so as to allow the storage and removal of common hand tools used in the construction profession. It is also the intent of this invention to have access through an open topped vehicle cover so as to allow access to said storage container from the exterior of said open topped vehicle cover thus providing an organized tool and storage area, protection for cargo from weather elements, and a means of securing both the tool storage area and the cargo area. It is also the intent of this invention to have a support means for said container that is quickly detachable and that does not require the detachment of said open topped vehicle cover from said open topped vehicle in order to remove said container from said vehicle thus allowing said vehicle in combination with said cover to be quickly converted for recreational use. It is also the intent of this invention for said container to have its own transportable means thus making rapid removal of said container from said vehicle possible. It is also the intent of this invention for said quick detachability and said transporting means of said container to allow said container to be quickly converted for use at job sites as a tool organizer, nail and staple etc. organizer, and a portable work table.

Further objectives and advantages of my invention will become apparent from consideration of the drawings and ensuing description thereof.

BRIEF DESCRIPTION OF THE DRAWINGS

FIG. 2 is an end perspective view of the tool and/or storage container portion of the invention shown in FIG. 1.

FIG. 3 is a perspective view of the sliding tray which slides on runners in the tool and/or storage container in FIG. 2. The sliding tray has slots for accepting drawers.

FIG. 4 is a perspective view of a drawer that fits into any of the slots of the sliding tray of FIG. 3.

DESCRIPTION OF THE PREFERRED EMBODIMENT

Figure 1:
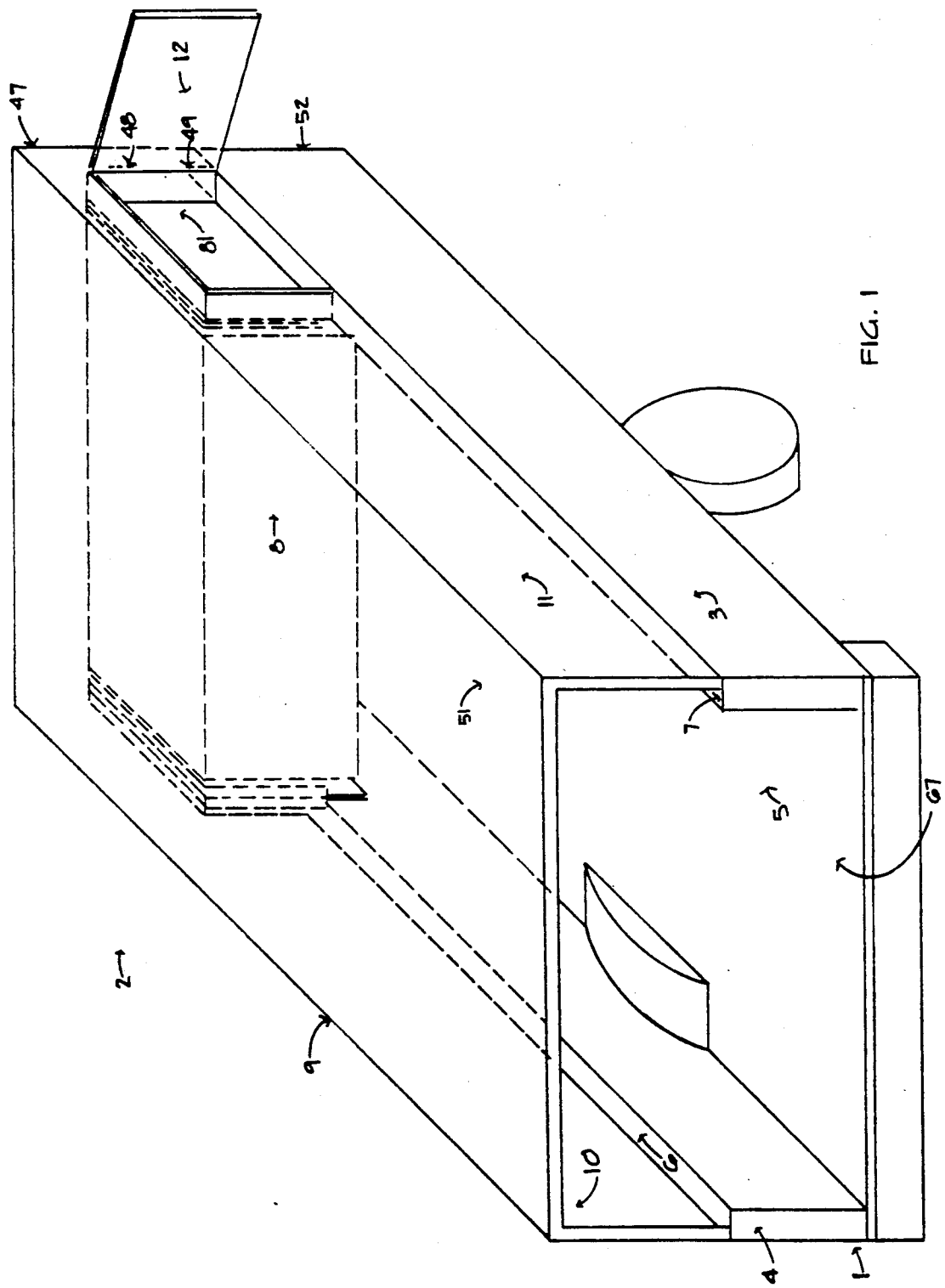
FIG. 1 is a perspective view looking from a position behind and to the right of an open topped vehicle bed. The vehicle has this invention, a vehicle cover with an accessible across-the-bed tool and/or storage container, shown on the vehicle bed.

Referring now to FIG. 1. The invention is shown in combination with an open topped vehicle, such as a pick up bed 1. Number 1 is hereafter referred to as vehicle. The invention is generally indicated by the number 2. The vehicle bed is defined by vertically extending walls 3 and 4, a front vertically extending wall 52, and a floor 5. The invention 2 is attached to the top surfaces 6 and 7 of the vertically extending walls 3 and 4, thus forming a cargo area 67. The cargo covering vehicle cover portion of the invention, hereafter to be referred to as cover, is indicated by the number 9. The cover 9 consists of two vertical walls 10 and 11, a vertical front 47, and a rear door that is not shown in FIG. 1 for clarity, and a top 51. The end accessible across-the-bed tool and/or storage container portion of the invention, hereafter to be referred to as tool box, shown as 8 is attached to the vertical sides 10 and 11 of the cover 9 by an attachment means using the expandable extension bracket 17 shown in FIG. 2 and FIG. 5. Said tool box 8 is also attached to sidewalls 3 and 4 of vehicle 1 by means of the angle brace 77 shown in FIG. 6. Again referring to FIG. 1, definement of extension bracket 17 and other components of said tool box 8 are left off for clarity. There is an access opening 81 through said side 10 an 11 that has a covering means. One of these covering means 12 is shown in FIG. 1. The said covering means 12 has a means of hinging to the said cover 9. Possible hinging means are shown and are numbered 48 and 49.

Referring now to FIG. 2. The tool box 8 portion of the invention 2 is shown in an end perspective view. Said tool box 8 consists generally of a floor 13 with two vertically extending sides 14 and 15 and a top 16. Each end of the said tool box 8 has an access opening 50. Shown inside said tool box 8 is a sliding tray 18 which slides on horizontal runners 19 and 20. At both ends of said horizontal runners 19 and 20 there are slightly extended vertical risers 21 and 22. There is a handle 23 on both ends at the bottom of sliding tray 18. On the side 15 of said tool box 8 are two storage sheaths 24 and 25. There is an expandable extension bracket 17 with an attachment means for attaching said expandable extension bracket 17 to the said top 16 and said sides 14 and 15 on each end of said tool box 8. The said expandable extension bracket 17 consists generally of a horizontal top and bottom 56 and 26 with two perpendicular sides 57 and 58. Each of said sides 57 and 58 and said top and bottom 56 and 26 having flaps 59-62 formed at right angles. The said expandable extension bracket 17 is shown clearly in FIG. 5.

Referring now to FIG. 3. The sliding tray 18 is shown. The said sliding tray 18 consists generally of a floor 27, two vertically extending sides 28 and 29, a top 30, one center divider 31, and four drawer slot dividers 32-35. Each drawer slot opening 36 has a vertically extending raised lip 37 at the front bottom. Handle 23 is also shown.

Referring now to FIG. 4. A drawer 38 is shown. This said drawer 38 is one of a number of drawers that slide into and from the drawer slots 36 of sliding tray 18 shown in FIG. 3. Again referring to FIG. 4, said drawer 38 consists generally of a floor 39 with two vertically extending sides 40 and 41, a vertically extending back 42, and a vertically extending front 43 with a drawer pull 46. On said sides 40 and 41 are divider slots. One of these said divider slots is numbered 44. One removable divider is shown and numbered 45.

Figure 5:
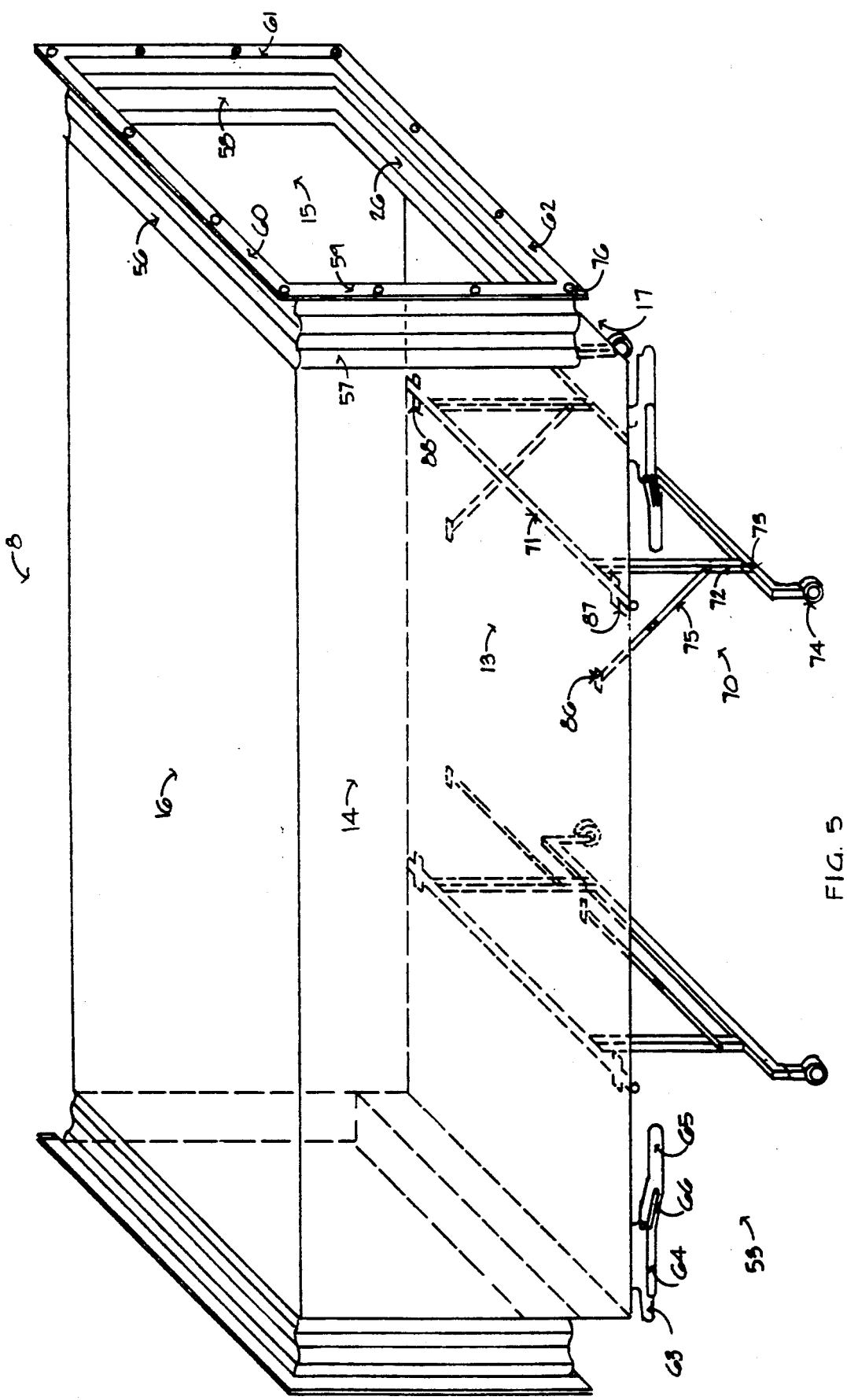
FIG. 5 is a side perspective view of the tool and/or storage container shown in FIG. 2.

Referring now to FIG. 5. The tool box 8 portion of the invention is shown in a side perspective view. The inner components are left off for clarity. Attached to the bottom 13 are quick release, bolt action support means 53. The said support means 53 consists generally of a cast attachment base and barrel combination 63, a cylinder 64, a handle 65, and two straps. One of the straps can be seen and is numbered 66. The handle is connected to the base and barrel combination 63 by an attachment means that allow a swivel movement. The straps 66 are connected to both the cylinder 64 and the handle 65 by the same attachment means allowing swivel movement. The support means 53 is available from some hardware dealers at this time. Also attached to the bottom 13 of said tool box 8 are a plurality of foldable leg supports 70. The said foldable leg supports 70 consists generally of a length of tubing 71 attached to a plurality of vertically extending legs 72. Attached perpendicular to said legs 72 and parallel with said tubing 71 is a brace 73. Attached at each end of said brace 73 at right angles are adjustable swivel casters 74. Near the bottom of said legs 72 and angling upward to the said bottom 13 of said tool box 8 are hinged braces 75. At the top of the said hinge brace 75 is a "U" shaped bracket 86 attached to the said bottom 13 of the said tool box 8. The said hinge braces 75 consists generally of a pair of lengths of material hinged at the center and attached to the said "U" shaped bracket 86 and said extension legs 72 by a means that allow swivel movement. The said length of tubing 71 is nesting in collar brackets 87 and 88. A diameter difference allows said tubing 71 to rotate within said collar brackets 87 and 88. Foldable legs similar to the ones shown in FIG. 5 and described here are commonly used on folding tables at this time. At each end of said tool box 8 the said extension bracket 17 is shown. Said sides 57 and 58, top 56 and bottom 26 of said extension bracket 17 are made of a soft material such as vinyl. Flaps 59-61 are formed at right angles to the said top and bottom 56 and 26, and sides 57 and 58 of said extension bracket 17. The said material such as vinyl can be attached to the said tool box 8 and said flaps 59-61 by one of many attachment means commonly used. Attached on the face of said flaps 59-61 are the male portion of snaps. One of these said male portion of snaps is numbered 76.

Figure 6:
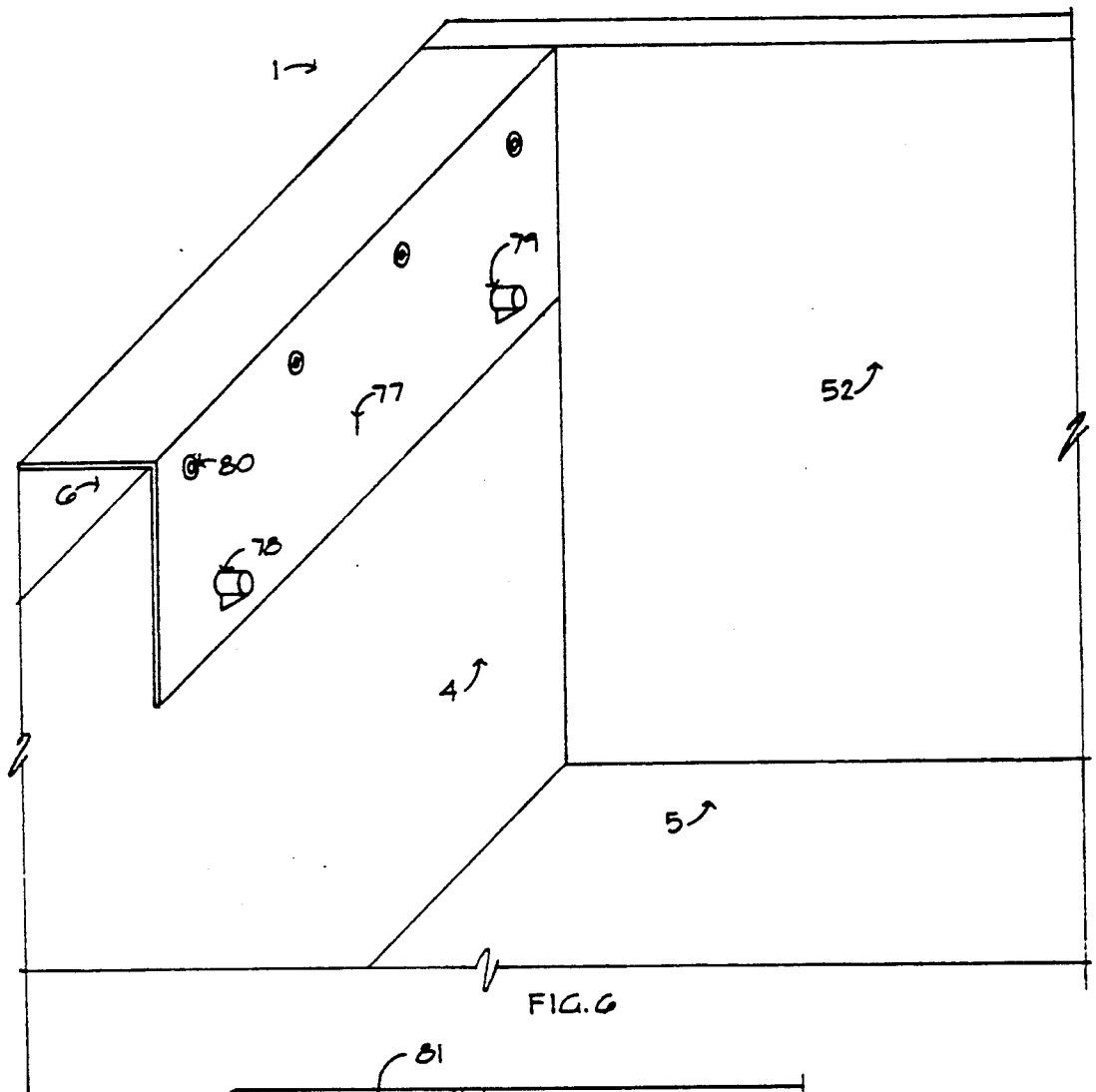
FIG. 6 is a perspective view of a support brace for accepting the support means of the storage container shown in FIG. 5.

Referring now to FIG. 6. The front left portion of the open topped vehicle 1, shown in FIG. 1, is shown without an open topped vehicle cover. The components of said open topped vehicle 1 are numbered to coincide with the numbering shown in FIG. 1. Referring again to FIG. 6, an angle brace 77 is shown attached to side wall 4 of the said open topped vehicle 1. The said angle brace 77 consists generally of a plate bent or welded so as to form a right angle. On the side face of said angle brace 77 are female cylinders 78 and 79. Also on the side face of said angle brace 77 are female portions of snaps. One of these said female portions of snaps is numbered 80.

Figure 7:
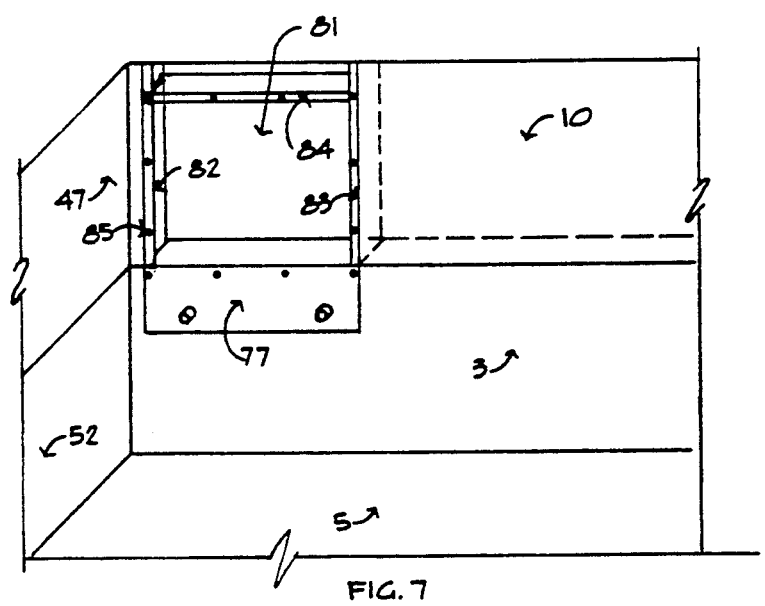
FIG. 7 is a perspective view looking from inside the open topped vehicle bed shown ion FIG. 1 with the tool and/or storage container removed. The view is looking toward the access opening. The support brace shown in FIG. 6 can be seer below the access opening.

Referring now to FIG. 7. The access opening 81 through side 11 of the cover 9, as numbered in FIG. 1 is shown from inside cargo area 67 with tool box 8 removed for clarity. The angle brace 77, referred to in FIG. 6, is shown. The access opening 81 is formed by upright studs 82 and 83, top crossmember 84, and the top portion of said angle brace 77. On the face portion of said studs 82 and 83, said crossmember 84, and said angle brace 77 are the female portions of snaps. One of these said female snaps is numbered 85.

Referring now to FIG. 6. The angle brace 77 can be attached to the vehicle sidewall 4 and weather proofed by one of many means well known in the art.

Referring now to FIG. 1. The invention 2 can be attached to vehicle 1 and weather proofed by one of many different means well known in the art. The tool box 8 portion of said invention 2 is made accessible from outside the cover 9 by an access opening that has a closeable and lockable means. In FIG. 1 this said access opening is covered by a hinged covering means 12. All of many differing said access opening covering means 12 would be in the spirit of this invention.

Referring now to FIG. 2. The tool box 8 portion of invention 2 can be molded of a material such as plastic or fiberglass including the runners 19 and 20 with the extended vertical risers 21 and 22 and the storage sheaths 24 and 25 or made of a material such as metal with these interior parts attached by one of many means such as rivets. Said storage sheaths 24 and 25 are of such size as to store particular items. The said storage sheaths 24 and 25 shown are for storing two foot and four foot levels respectively. The end accessibility of said tool box 8 allows easy storage and removal of lengthy items stored in said sheaths sized for such items.

Referring now to FIG. 3. The sliding tray 18, including the raised lips 37 and the handle 23, can be molded of materials such as plastic or fiberglass or made of one of many materials such as metal with the different components attached together by one of many means. The end accessibility of tool box 8 allows the end accessibility of said sliding tray 18 forming a drawer unit not practical in standard top accessible tool boxes.

Referring now to FIG. 4. Drawer 38 is similar to drawers already being used in things such as nut and bolt organizers and some types of tool boxes. The said drawer 38 can be molded from material such as plastic or fiberglass or made of a material such as metal. The divider slots 44 can be molded as part of or attached to the drawer sides 40 and 41. Divider 45 can be made of one of many materials such as plastic or metal. Drawer pull 46 can be molded as part of said drawer 38 or made separate, from one of many materials such as metal, and attached to drawer front 43 by one of several means such as brads.

Referring now to FIG. 2. The slightly extended vertical risers 21 and 22 serve the purpose of halting the sliding tray 18 so as to prevent a person from accidentally pulling said sliding tray 18 completely out of tool box 8 and spilling the contents thereof. The said sliding tray 18 can be completely removed from said tool box 8 by simply raising said sliding tray 18 slightly while pulling it toward the access opening 50. It is recognized other means of halting said sliding tray 18 could be used and that all such means would be in the spirit of this invention. The drawer unit design and the easy removal of said sliding tray 18 allow said sliding tray 18 to easily be taken to a job site separately and serve as an organizer of small job related items.

Referring now to FIG. 3. The raised lip 37 at the front bottom of each drawer slot 36 is to prevent each drawer 38, shown in FIG. 4, from accidentally spilling out of said drawer slots 36 while the vehicle 1, shown in FIG. 1, is in transit. Each said drawer 38 can easily be completely removed from said drawer slots 36 by simply raising said drawer 38 slightly while pulling said drawer 38 from drawer slot 36. Other means of preventing said drawer 38 from accidentally coming out of said drawer slots 36 could be used and would be in the spirit of this invention. The drawer unit design and easy removal of said drawer 38 allow said drawer 38 to easily be taken to a job site separately and serve as an organizer of small job related items.

Referring now to FIG. 4. The divider 45 can easily be placed into any of the divider slots 44 or left out completely thus making available different size storage areas.

Referring now to FIG. 5. When cover 9 portion of invention 2, shown in FIG. 1, is to be used for recreational purposes, tool box 8 can be easily removed for storage. The procedure is simply to unsnap expansion brackets 17 from said cover 9, fold down leg supports 70, disengage quick release bolt action support means 53, squeeze expansion brackets 17 to shortened position, turn and roll said tool box 8 to rear exit of vehicle. The same procedure can easily be used allowing said tool box 8 to double as a portable table, tool organizer, and small job related item organizer at job sites. The above said procedure can simply be reversed to form the original work vehicle. It is recognized that other means of attachment and support could be used for said tool box 8. All of many differing means of support for said tool box 8 would be in the spirit of this invention. It is also recognized that other means could be used for expansion bracket 17. One such means would be telescopic. All of many differing extendable means would be in the spirit of this invention.

While I have shown and described several embodiments in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are obvious to one of ordinary skill in the art.

What is claimed is:

1. A storage container for a truck having a bed, opposing sidewalls with inwardly facing surfaces, and a longitudinal axis, said container comprising:
   an elongated rectangular hollow body having a longitudinal axis;
   said body being disposed across the truck bed so that the longitudinal axis of said body is transverse to the longitudinal axis of the truck;
   said body including two opposite ends that are open for accessibility; and
   means for attaching each end of the storage container to an inwardly facing surface of each sidewall so that the open ends of the container are accessible above and across the truck bed sidewalls.

2. The storage container of claim 1 further comprising:
   an expandable bracket including a top, bottom, and opposite sides attached to each end of the storage container.

3. The storage container of claim 1 further comprising:
   a plurality of foldable leg supports with rolling means attached to the storage container.

4. In combination, a cover having a top, two vertically disposed side walls, a vertically disposed front and a rear closure means; a pick-up truck having a bed, opposing side walls with inwardly facing surfaces, and a longitudinal axis; and a storage container, the improvement comprising:
   said cover including an access opening in each side wall thereof;
   said storage container having an elongated rectangular hollow body having a longitudinal axis;
   said body being disposed across the truck bed so that the longitudinal axis of said body is transverse to the longitudinal axis of the truck;
   said body including two opposite ends that are open for accessibility;
   means for attaching each end of the storage container to an inwardly facing surface of each sidewall so that the open ends of the container are accessible above and across the truck bed sidewalls; and
   said cover access openings being aligned with the open ends of the storage container for accessibility of the storage container through said cover.

* * * * *